US009776641B2

United States Patent
Matsuno et al.

(10) Patent No.: US 9,776,641 B2
(45) Date of Patent: Oct. 3, 2017

(54) TRAVEL CONTROL APPARATUS FOR VEHICLE

(71) Applicant: SUBARU CORPORATION, Tokyo (JP)

(72) Inventors: Koji Matsuno, Tokyo (JP); Harunobu Horiguchi, Tokyo (JP); Hajime Oyama, Tokyo (JP); Yasushi Takaso, Tokyo (JP); Masato Mizoguchi, Tokyo (JP); Takayuki Nagase, Tokyo (JP); Eiichi Shiraishi, Tokyo (JP); Shiro Ezoe, Tokyo (JP); Satoru Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/923,236

(22) Filed: Oct. 26, 2015

(65) Prior Publication Data

US 2016/0114811 A1    Apr. 28, 2016

(30) Foreign Application Priority Data

Oct. 27, 2014    (JP) .................................. 2014-218514

(51) Int. Cl.
*B60W 50/02* (2012.01)
*B60W 10/20* (2006.01)
(Continued)

(52) U.S. Cl.
CPC ........ *B60W 50/0225* (2013.01); *B60W 10/18* (2013.01); *B60W 10/20* (2013.01); *B60W 30/18163* (2013.01)

(58) Field of Classification Search
CPC ....... B60W 30/18163; B60W 50/0225; B60W 10/20; B60W 10/18; B60W 30/09; B60W 2050/0002
See application file for complete search history.

(56) References Cited

U.S. PATENT DOCUMENTS

| 5,521,579 A | * | 5/1996 | Bernhard | ........... | B60K 31/0008 180/167 |
| 2004/0193374 A1 | * | 9/2004 | Hac | .................... | B60K 31/0008 701/301 |

(Continued)

FOREIGN PATENT DOCUMENTS

JP    2011-162132 A    8/2011

*Primary Examiner* — Courtney Heinle
(74) *Attorney, Agent, or Firm* — McDermott Will & Emery LLP

(57) ABSTRACT

A travel control apparatus for a vehicle includes: a travel environment information acquisition unit that acquires travel environment information on a travel environment where the vehicle travels; a travel information detector that detects travel information on the vehicle; and an overtaking controller that detects an overtaking target vehicle ahead of the vehicle in an identical travel lane on the basis of the travel environment information and the travel information, and overtakes the overtaking target vehicle using automatic driving control. When failures are detected in relation to the travel environment information acquisition and in a steering system of the vehicle during the overtaking control, the overtaking controller modifies the overtaking control by activating required substitute control in accordance with the travel environment information obtained most recently before detecting the travel environment information acquisition failure, information on the overtaking target vehicle, the travel information, and conditions during the overtaking control.

20 Claims, 10 Drawing Sheets

(51) Int. Cl.
*B60W 10/18* (2012.01)
*B60W 30/18* (2012.01)

(56) References Cited

U.S. PATENT DOCUMENTS

| | | | | |
|---|---|---|---|---|
| 2006/0009910 | A1* | 1/2006 | Ewerhart | B60W 30/143 |
| | | | | 701/301 |
| 2009/0088925 | A1* | 4/2009 | Sugawara | B60W 30/12 |
| | | | | 701/41 |
| 2011/0196592 | A1* | 8/2011 | Kashi | B60W 30/16 |
| | | | | 701/96 |
| 2011/0241862 | A1* | 10/2011 | Debouk | B60W 50/035 |
| | | | | 340/439 |
| 2012/0203435 | A1* | 8/2012 | Braennstroem | B60T 7/22 |
| | | | | 701/70 |
| 2012/0283907 | A1* | 11/2012 | Lee | B60T 8/17557 |
| | | | | 701/31.9 |
| 2013/0253793 | A1* | 9/2013 | Lee | B60W 50/029 |
| | | | | 701/70 |
| 2014/0136015 | A1* | 5/2014 | Hayakawa | B60T 7/22 |
| | | | | 701/1 |
| 2015/0120124 | A1* | 4/2015 | Bartels | B60W 50/10 |
| | | | | 701/23 |
| 2015/0360684 | A1* | 12/2015 | Matsuno | B60Q 9/00 |
| | | | | 701/23 |
| 2015/0360721 | A1* | 12/2015 | Matsuno | B62D 15/0255 |
| | | | | 701/41 |
| 2016/0031371 | A1* | 2/2016 | Kimata | B60R 1/00 |
| | | | | 348/148 |
| 2016/0121906 | A1* | 5/2016 | Matsuno | B60K 28/10 |
| | | | | 701/23 |

* cited by examiner

TRAVEL CONTROL APPARATUS FOR VEHICLE

CROSS-REFERENCE TO RELATED APPLICATIONS

The present application claims priority from Japanese Patent Application No. 2014-218514, filed on Oct. 27, 2014, the entire contents of which are hereby incorporated by reference.

BACKGROUND

1. Technical Field

The present invention relates in particular to a travel control apparatus for a vehicle, with which a preceding vehicle in an identical lane can be overtaken using an automatic driving technique.

2. Related Art

Recently, various apparatuses employing automatic driving techniques that enable a driver to drive a vehicle in increased comfort and more safely have been developed and proposed. Japanese Unexamined Patent Application Publication No. 2011-162132, for example, discloses a technique employed in an automatic driving apparatus that performs automatic driving control to ensure that a vehicle follows a road on which the vehicle is traveling. In this technique, a vehicle equipped with the apparatus is controlled to change lanes to a travel lane after detecting that the lane in which the vehicle is traveling is an overtaking lane.

When a system failure (for example, a failure relating to acquisition of travel environment information or a failure in a steering system used to execute a lane change) occurs during automatic driving while an overtaking target vehicle ahead of the vehicle in the same travel lane is detected and overtaking control is executed to overtake the overtaking target vehicle using automatic driving control, there is a great need to return the vehicle automatically to the original travel lane using a technique such as that of the automatic driving apparatus disclosed in Japanese Unexamined Patent Application Publication No. 2011-162132. However, overtaking control is executed through a combination of complicated travel operations such as a lane change for the purpose of overtaking, acceleration following the lane change, and a lane change back to the original lane following overtaking acceleration, and unless failsafe control corresponding to conditions during each of the overtaking control operations is executed when the system failure occurs, it may be impossible to secure sufficient safety.

SUMMARY OF THE INVENTION

It is desirable to provide a travel control apparatus for a vehicle that can perform appropriate failsafe control so that sufficient safety is secured even when an acquisition failure of travel environment information occurs and a failure occurs in a steering system used to execute a lane change while executing overtaking control using an automatic driving technique.

An aspect of the present invention provides a travel control apparatus for a vehicle including: a travel environment information acquisition unit that acquires travel environment information relating to a travel environment in which the vehicle travels; a travel information detector that detects travel information relating to the vehicle; and an overtaking controller that detects an overtaking target vehicle in front of the vehicle in an identical travel lane on the basis of the travel environment information and the travel information, and overtakes the overtaking target vehicle using automatic driving control. When an acquisition failure is detected in the travel environment information acquisition unit and a failure is detected in a steering system of the vehicle during the overtaking control, the overtaking controller modifies the overtaking control by activating required substitute control in accordance with the travel environment information obtained most recently before detecting the acquisition failure in the travel environment information acquisition unit, information relating to the overtaking target vehicle, the travel information, and conditions during the overtaking control.

DETAILED DESCRIPTION

An implementation of the present invention will be described below on the basis of the drawings.

Figure 1:
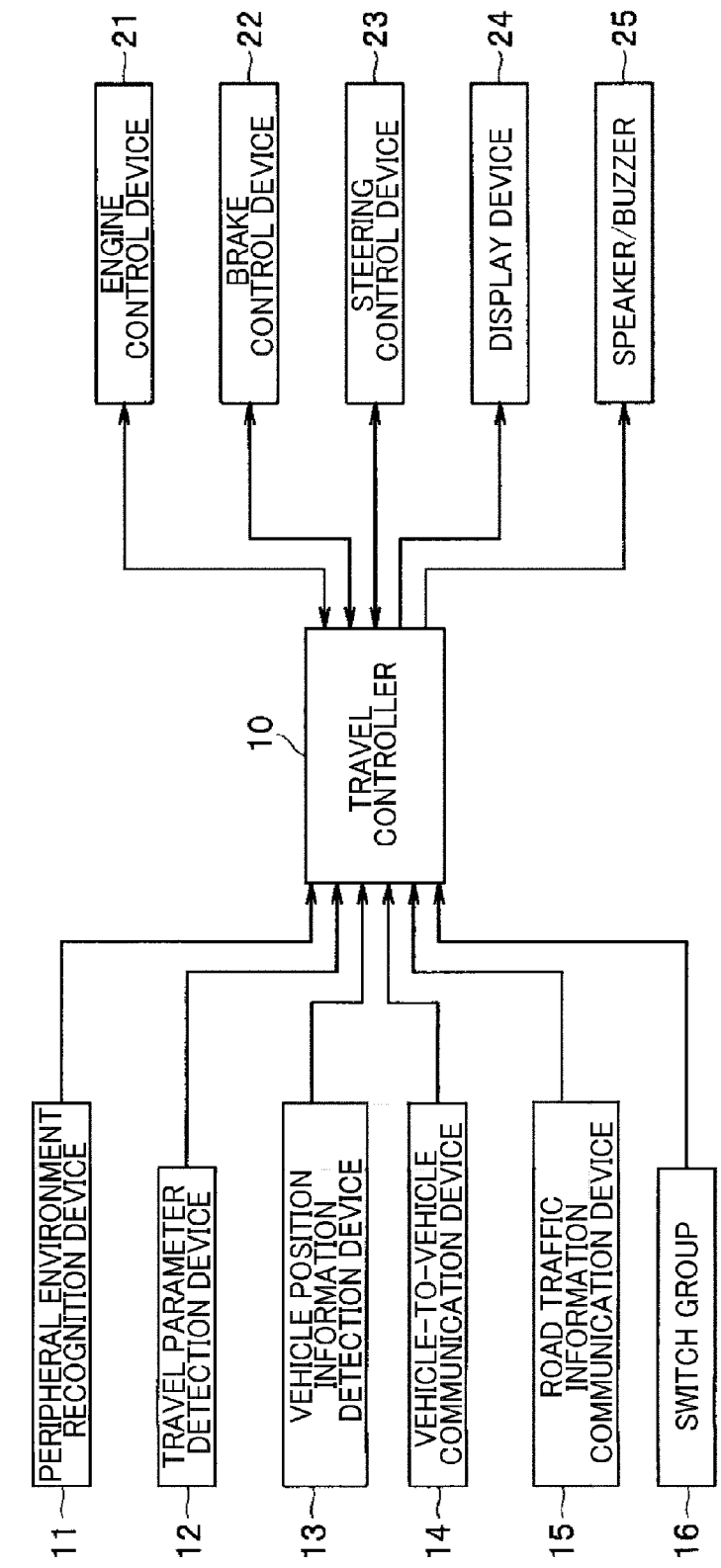
FIG. 1 is an overall view illustrating a configuration of a travel control apparatus for a vehicle according to an implementation of the present invention.

In FIG. 1, a reference numeral 1 denotes a travel control apparatus for a vehicle. In the travel control apparatus 1, input devices including a peripheral environment recognition device 11, a travel parameter detection device 12, a vehicle position information detection device 13, a vehicle-to-vehicle communication device 14, a road traffic information communication device 15, and a switch group 16, and output apparatuses including an engine control device 21, a brake control device 22, a steering control device 23, a display device 24, and a speaker/buzzer 25 are connected to a travel controller 10.

The peripheral environment recognition device 11 is constituted by a camera device (a stereo camera, a monocular camera, a color camera, or the like) that includes a solid state imaging device or the like and is provided in a vehicle cabin of a vehicle equipped with travel control apparatus 1 (hereinafter referred to as "the vehicle") in order to obtain image information by photographing an external environment of the vehicle, a radar device (a laser radar, a millimeter wave radar, or the like) that receives reflection waves from three-dimensional objects existing on the periphery of the vehicle, a sonar, and so on (none of the above are illustrated in the drawings).

The peripheral environment recognition device 11 performs known grouping processing, for example, in relation to distance information on the basis of the image information photographed by the camera device, and by comparing the grouped distance information with preset three-dimensional road shape data, three-dimensional object data, and so on, extracts positions (distances and angles), as well as speeds, of lane division line data, side wall data indicating guard rails and curbstones existing alongside a road, three-dimensional object data indicating vehicles and the like, and so on relative to a vehicle.

The peripheral environment recognition device 11 also detects positions (distances and angles), as well as speeds, of three-dimensional objects from which reflection waves are received on the basis of reflection wave information obtained by the radar apparatus. Note that in this implementation, a maximum distance (a distance to a three-dimensional object or the farthest distance of the lane division line) that can be recognized by the peripheral environment recognition device 11 is set as a visibility limit. In one implementation, the peripheral environment recognition device 11 may serve as a travel environment information acquisition unit.

Further, when a failure occurs in the camera device, the radar device, the sonar, or the like of the peripheral environment recognition device 11, or when the precision with which the peripheral environment is recognized deteriorates due to adverse weather or the like, for example, the failure in the peripheral environment recognition device 11 is output to the travel controller 10.

The travel parameter detection device 12 detects travel information relating to the vehicle, more specifically a vehicle speed V, a steering torque Tdrv, a steering angle θH, a yaw rate γ, an accelerator opening, a throttle opening, a road surface gradient Ug (an uphill gradient will be indicated by "+") of a travel road surface, an estimated road surface friction coefficient value μe, and so on. In one implementation, the travel parameter detection device 12 may be provided as a travel information detector.

The vehicle position information detection device 13 is a conventional navigation system, for example, which receives radio waves emitted by a global positioning system (GPS) satellite, detects a current position on the basis of the radio wave information, and specifies the position of the vehicle on map data stored in advance on a flash memory, a compact disc (CD), a digital versatile disc (DVD), a Blu-ray (registered trademark) disc, a hard disk drive (HDD), or the like, for example.

The pre-stored map data include road data and facility data. The road data include link position information, link type information, node position information, node type information, information indicating connection relationships between the nodes and the links, or in other words information indicating branching and convergence locations on the road, information indicating a maximum vehicle speed on branch roads, and so on. The facility data include a plurality of records relating to respective facilities, and each record includes information data indicating the name position and facility type (a department store, a store, a restaurant, a parking lot, a park, a location for repairing broken-down vehicles) of a subject facility. When an operator inputs a destination while the vehicle position is displayed on the map position, a route from a starting location to the destination is calculated in a predetermined manner, and then displayed on the display device 24, which is constituted by a display or a monitor, and output as voice guidance from the speaker/buzzer 25, so that the operator can be guided to the destination. In one implementation, the vehicle position information detection device 13 may be provided as the travel environment information acquisition unit.

The vehicle-to-vehicle communication device 14 is constituted by a short range wireless communication device having a communication area of approximately 100 [m], such as a wireless LAN, for example, and is capable of communicating directly with another vehicle without passing through a server or the like so as to exchange information with the other vehicle. Through mutual communication with the other vehicle, the vehicle-to-vehicle communication device 14 exchanges vehicle information, travel information, traffic environment information, and so on. The vehicle information includes unique information indicating a vehicle type (in this implementation, a passenger vehicle, a truck, a motorcycle, and so on). Further, the travel information includes vehicle speed and vehicle position information, information indicating whether or not a brake lamp is illuminated, information indicating whether or not a direction indicator used to indicate a right or left turn is flashing, and information indicating whether or not a hazard lamp used during an emergency stop is flashing. Furthermore, the traffic environment information includes information that varies in accordance with the condition of road congestion information, construction work information, and so on. In one implementation, the vehicle-to-vehicle communication device 14 may be provided as the travel environment information acquisition unit.

The road traffic information communication device 15 receives road traffic information relating to congestion, accidents, construction work, required times, and parking lots in real time from an FM multiplex broadcast or a transmitter disposed on the road using a so-called Vehicle Information and Communication System (VICS; registered trademark), and displays the received traffic information on the pre-stored map data described above. In one implementation, the road traffic information communication device 15 may be provided as the travel environment information acquisition unit.

The switch group 16 is a group of switches relating to control for assisting driving by a driver, and is constituted by, for example, a switch for executing travel control at a preset fixed speed or a switch for executing following control to maintain an inter-vehicle distance and an inter-vehicle time to a preceding vehicle at preset fixed values, a switch for executing lane keep control for controlling travel so that the vehicle stays in a set travel lane, a switch for executing lane deviation prevention control to prevent the vehicle from deviating from the travel lane, a switch for permitting execution of overtaking control in order to overtake a preceding vehicle (an overtaking target vehicle), a switch for executing automatic driving control, in which all of these control operations are performed in a coordinated fashion, a switch for setting the vehicle speed, inter-vehicle distance, inter-vehicle time, speed limit, and so on required in the respective control operations, a switch for canceling the respective control operations, and so on.

The engine control device 21 is a conventional control unit that performs main control such as fuel injection control, ignition timing control, control of an electronically controlled throttle valve, and the like on an engine (not illustrated) of the vehicle on the basis of an intake air amount, a throttle opening, an engine water temperature, an intake air temperature, an oxygen concentration, a crank angle, the accelerator opening, and other vehicle information, for example.

The brake control device 22 controls a braking system including a hydraulic unit and an electric booster, for example (neither of which are illustrated in the drawings). Here, the hydraulic unit is capable of activating brake devices of four wheels independently of a brake operation performed by the driver, and the brake control device 22 uses the hydraulic unit to perform yaw moment control (yaw brake control) to apply a yaw moment to the vehicle by means of a conventional antilock brake system (ABS) function, an antiskid control function for stabilizing vehicle behavior, or the like on the basis of the brake switch, wheel speeds of the four wheels, the steering angle $\theta H$, the yaw rate $\gamma$, and other vehicle information, for example. When brake force command values for the respective wheels are input into the hydraulic unit from the travel controller 10, the brake control device 22 can calculate a brake fluid pressure of each wheel on the basis of the brake forces, and generate braking force to decelerate the vehicle automatically and apply a yaw moment to the vehicle by means of yaw brake control. Furthermore, when a system failure (a failure relating to acquisition of the travel environment information and a failure in a steering system of the vehicle) occurs during automatic driving overtaking control and a signal indicating that yaw brake control is to be executed to reduce the yaw rate $\gamma$ of the vehicle at that time is input from the travel controller 10, the brake control device 22 modifies a unique stability factor A of the vehicle (to a preset value Af that is larger than a normal value), calculates a target yaw rate $\gamma t$ using the stability factor Af, and executes yaw brake control to reduce the yaw rate $\gamma$ on the basis of the target yaw rate $\gamma t$.

Further, the electric booster is basically used to assist a brake pedal depression force with thrust from an electric motor. The electric booster is capable of converting motor torque generated by the electric motor into assist thrust via a ball screw or the like, and applying the assist thrust to a master cylinder piston. When a brake force command value is input into the electric booster from the travel controller 10, the brake control device 22 can calculate the assist thrust on the basis of the brake force and generate braking force required for automatic deceleration control. Furthermore, when a command to modify a characteristic of the electric booster is input from the travel controller 10, the brake control device 22 modifies a braking force characteristic generated in accordance with the brake pedal depression force obtained in a brake operation performed by the driver from a normal characteristic in a direction for increasing the braking force value and a braking force generation response corresponding to the brake pedal depression force. The brake control device 22 then generates the braking force on the basis of the modified characteristic.

The steering control device 23 is a conventional control device that controls an assist torque generated by an electric power steering motor (not illustrated) provided in the steering system of the vehicle on the basis of the vehicle speed, a steering torque, the steering angle, the yaw rate, and other vehicle information, for example. The steering control device 23 is also capable of lane keep control for controlling travel so that the vehicle stays in the set travel lane, and lane deviation prevention control to prevent the vehicle from deviating from the travel lane. Accordingly, when one of the steering angle and the steering torque required for the lane keep control and the lane deviation prevention control is calculated by the travel controller 10 and input into the steering control device 23, the steering control device 23 drive-controls the electric power steering motor in accordance with the input control amounts. Further, the steering control device 23 detects a failure in the steering system, which includes a steering mechanism, a steering torque sensor, a steering angle sensor, and so on, and these failures are monitored by the travel controller 10.

The display device 24 is a device for providing the driver with visual warnings and notifications, such as a monitor, a display, or an alarm lamp, for example. Further, the speaker/buzzer 25 is a device for providing the driver with aural warnings and notifications. When a failure occurs in one of various devices of the vehicle, the display device 24 and the speaker/buzzer 25 issue warnings to the driver as appropriate.

The travel controller 10 detects an overtaking target vehicle in front of the vehicle in the same travel lane on the basis of the input signals from the respective devices 11 to 16 described above, and executes overtaking control to overtake the overtaking target vehicle using automatic driving control. When a failure relating to acquisition of the travel environment information and a failure in the steering system of the vehicle are detected during the overtaking control, the travel controller 10 modifies the overtaking control by activating required substitute control in accordance with the travel environment information obtained most recently before detecting the failure in the travel environment information acquisition unit, information relating to the overtaking target vehicle, the travel information, and conditions during the overtaking control.

More specifically, when a failure relating to acquisition of the travel environment information and a failure in the steering system of the vehicle are detected while performing a lane change from the travel lane to an overtaking lane after detecting the overtaking target vehicle, the lane change from the travel lane to the overtaking lane is canceled. When a front wheel steering angle $\delta f$ is not substantially zero, the yaw brake control is executed to reduce the yaw rate $\gamma$ of the vehicle.

Further, when a failure relating to acquisition of the travel environment information and a failure in the steering system of the vehicle are detected during an overtaking motion performed after detecting the overtaking target vehicle and changing lanes from the travel lane to the overtaking lane, and it is determined that a lane change back to the travel lane prior to the lane change can be performed safely on the basis of the travel environment information detected most recently before detecting the failure relating to acquisition of the travel environment information, the vehicle is returned to the travel lane prior to the lane change by activating the yaw brake control to apply a yaw moment to the vehicle using a brake force, whereupon deceleration control is executed in accordance with the visibility limit of the most recently detected travel environment information.

Furthermore, when a failure relating to acquisition of the travel environment information and a failure in the steering system of the vehicle are detected during an overtaking motion performed after detecting the overtaking target vehicle and changing lanes from the travel lane to the overtaking lane, and when the overtaking target vehicle exists in the original travel lane according to the travel environment information detected most recently before detecting the failure relating to acquisition of the travel environment information, deceleration control is executed in accordance with the vehicle speed of the overtaking target vehicle in order to retreat to a predetermined relative position assumed to be behind the overtaking target vehicle. The vehicle is then returned to the travel lane prior to the lane change by activating the yaw brake control to apply a yaw moment to the vehicle using a brake force, whereupon deceleration control is executed in accordance with the visibility limit of the most recently detected travel environment information.

Moreover, when a failure relating to acquisition of the travel environment information and a failure in the steering system of the vehicle are detected while changing lanes to the original travel lane after detecting the overtaking target vehicle, changing lanes from the travel lane to the overtaking lane, and overtaking the overtaking target vehicle, a lane change is performed to the original travel lane by activating the yaw brake control to apply a yaw moment to the vehicle using a brake force. In one implementation, the travel controller 10 may be provided as an overtaking controller.

Figure 2:
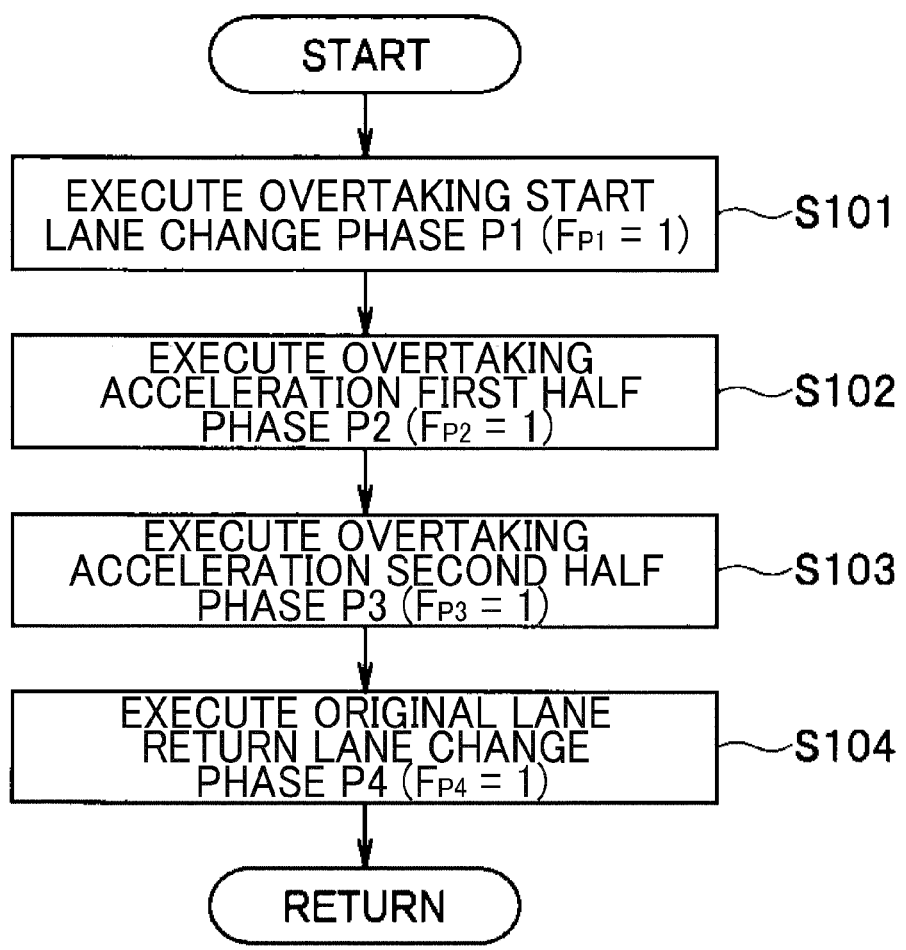
FIG. 2 is a flowchart of an overtaking travel control program according to this implementation of the present invention.
Figure 3:
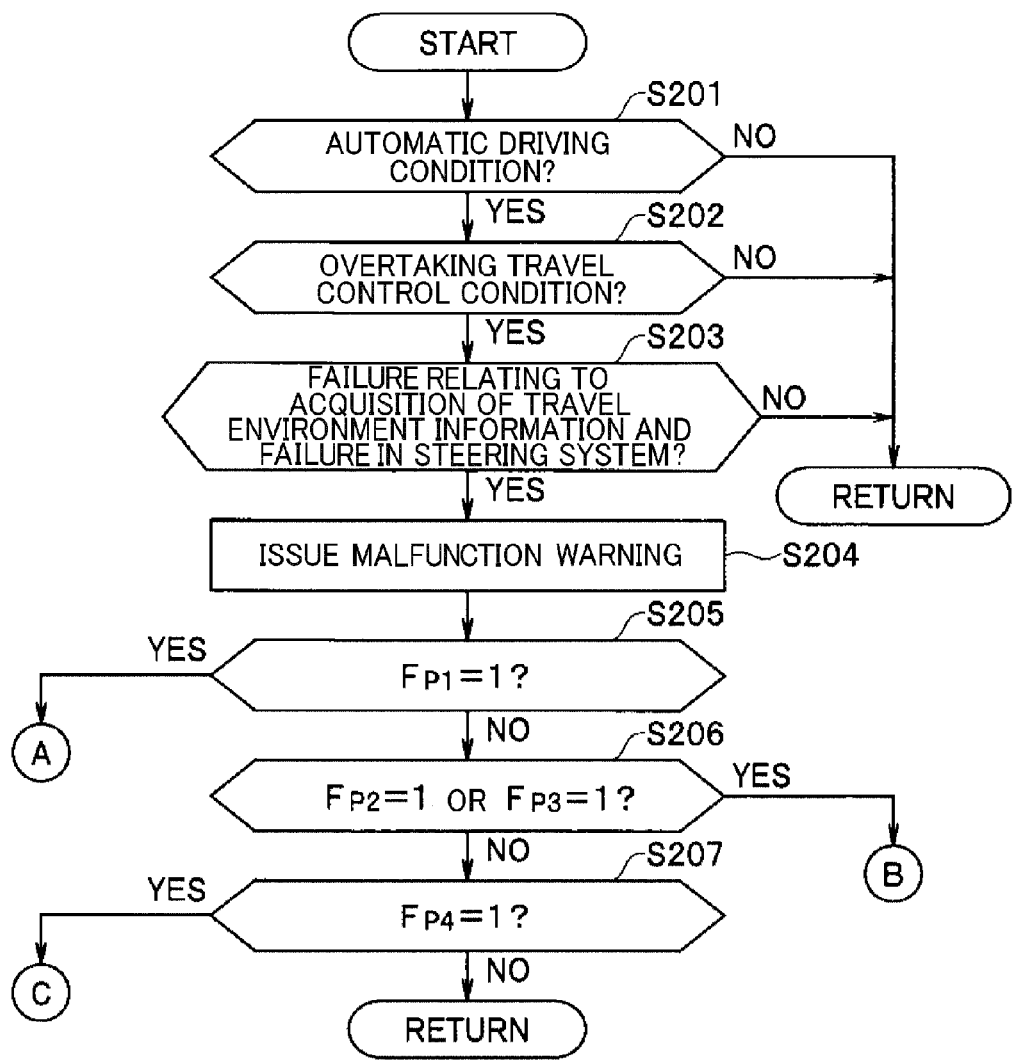
FIG. 3 is a flowchart of an overtaking travel failsafe program according to this implementation of the present invention.
Figure 9:
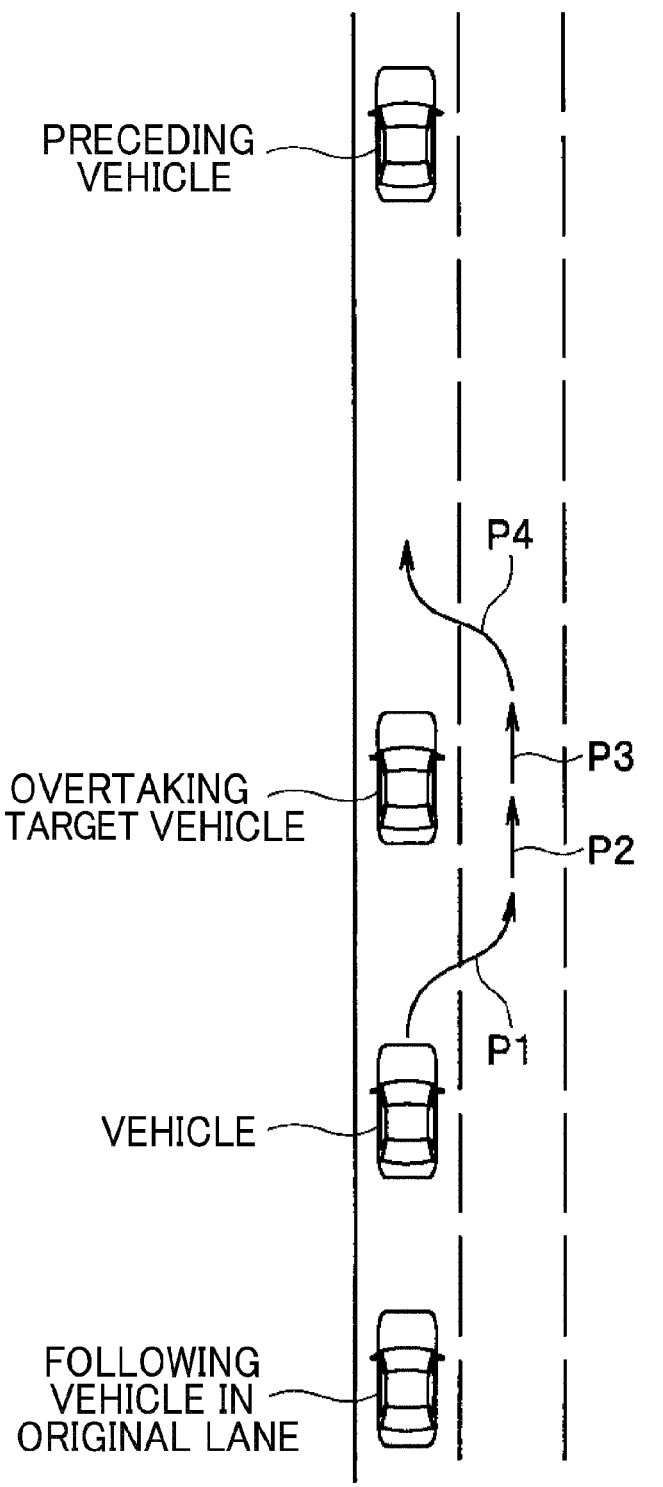
FIG. 9 is an illustrative view illustrating respective phases of the overtaking travel control according to this implementation of the present invention.

As illustrated on the flowchart in FIG. 2 and also in FIG. 9, the travel controller 10 according to this implementation executes overtaking travel control in four phases, namely an overtaking start lane change phase P1, an overtaking acceleration first half phase P2, an overtaking acceleration second half phase P3, and an original lane returning lane change phase P4. Travel control executed in each of these phases will be described below.

FIG. 2 is a flowchart illustrating an overall overtaking travel control program. First, in step (abbreviated to "S" hereafter) 101, the overtaking start lane change phase P1 illustrated in FIG. 9 is executed. Note that while the travel controller 10 executes the overtaking start lane change phase P1, an overtaking start lane change phase execution flag Fp1 is set (Fp1=1).

In this implementation, a vehicle trajectory of the vehicle during a lane change is assumed to be determined from a normalization polynomial of a minimum jerk ($\int d^3y/dx^3$) trajectory on a two-dimensional coordinate system on which a travel distance is set as an x direction and a lateral movement amount (a lane change width) is set as a y direction, for example.

In this case, assuming that $y(0)=0$, $y(1)=1$, $dy(0)/dx=d^2y(0)/dx^2=0$, $dy(1)/dx=d^2y(1)/dx^2=0$, Equation (1), illustrated below, is obtained.

$$y=6 \times x^5 - 15 \times x^4 + 10 \times x^3 \tag{1}$$

By implementing differential processing on Equation (1), Equations (2), (3), (4), illustrated below, are obtained.

$$dy/dx = 30 \times (x^4 - 2 \times x^3 + x^2) \tag{2}$$

$$d^2y/dx^2 = 60 \times (2 \times x^3 - 3 \times x^2 + x) \tag{3}$$

$$d^3y/dx^3 = 60 \times (6 \times x^2 - 6 \times x + 1) \tag{4}$$

When x is back-calculated at $d^3y/dx^3=0$ using Equation (4), Equation (5), illustrated below, is obtained.

$$x(d^3y/dx^3=0)=(3\pm 3^{1/2})/6 \tag{5}$$

When $d^2y/dx^2$ is calculated from this value of x using Equation (3), and a resulting normalized curvature value is set as an absolute value $|(d^2y/dx^2)\text{max}|$ of a maximum value of a lateral acceleration, a value of Equation (6), illustrated below, is obtained.

$$|(d^2y/dx^2)\text{max}|=10 \times 3^{1/2}/3 \cong 5.77 \tag{6}$$

Further, when a maximum lateral acceleration $(d^2Y/dt^2)\text{max}\_c$ during a lane change (a preset value) is expressed using the maximum value $(d^2y/dx^2)$ max of the lateral acceleration described above, Equation (7) illustrated below, in which a travel distance required for the lane change is set as L and the lane change width is set as W, is obtained.

$$(d^2y/dx^2)\text{max} \times W/(L/V)^2 = (d^2Y/dt^2)\text{max}\_c \tag{7}$$

When Equation (7) is solved in relation to the travel distance L, Equation (8), illustrated below, is obtained.

$$L=(5.77 \times W \times V^2/(d^2Y/dt^2)\text{max}\_c)^{1/2} \tag{8}$$

It is understood from Equation (8) that a distance L1 required in the overtaking start lane change phase P1 corresponds to Equation (9) illustrated below, in which the vehicle speed V at that time is V1.

$$L1=(5.77 \times W \times V1^2/(d^2Y/dt^2)\text{max}\_c)^{1/2} \tag{9}$$

Further, when an estimated normalized travel distance of the vehicle in the x direction is set as xe, Equation (10) is obtained.

$$xe=(\int V \times dt)/L \tag{10}$$

A relationship between the target yaw rate γt, the vehicle speed V, and the lateral acceleration $(d^2y/dx^2)$ is expressed by Equation (11), illustrated below, and therefore the target yaw rate γt can be expressed by Equation (12), illustrated below, using Equation (3).

$$\gamma t \times V = (d^2y/dx^2) \times W/(L/V)^2 \tag{11}$$

$$\gamma t = 60 \times (2 \times xe^3 - 3 \times xe^2 + xe) \times W \times V/L^2 \tag{12}$$

By inserting the target yaw rate γt into a relational expression (Equation (13)) of a target steering angle θHt, illustrated below, the target steering angle θHt required for the control (i.e. to be output to the steering control device 23) is determined.

$$\theta Ht = \gamma t \times n/G\gamma \tag{13}$$

Here, n is a steering gear ratio, and Gγ is a yaw rate gain. The yaw rate gain Gγ can be calculated using Equation (14), illustrated below, for example.

$$G\gamma = (1/(1+A \times V^2)) \times (V/l) \tag{14}$$

Here, A is the unique stability factor of the vehicle, and l is a wheel base.

Hence, in the overtaking start lane change phase P1 of S101, automatic steering control is performed by calculating the target steering angle θHt in Equation (13), whereupon the vehicle is caused to travel by the distance L1 of Equation (9). Note that V1 and L1 are used respectively as the vehicle speed V and the distance L required to calculate the target steering angle θHt.

Further, in this implementation, an example in which the vehicle trajectory of the vehicle during a lane change is determined using a normalization polynomial of the minimum jerk trajectory was described, but the present invention is not limited to this example, and the vehicle trajectory may be approximated using another curve function or the like.

When the overtaking start lane change phase P1 of S101 is completed, or in other words when the lane change is completed, the overtaking acceleration first half phase P2 of FIG. 9 is executed in S102. Note that while the travel controller 10 executes the overtaking acceleration first half phase P2, an overtaking acceleration first half phase execution flag Fp2 is set (Fp2=1).

In the overtaking acceleration first half phase P2, travel control is executed to accelerate the vehicle in the overtaking lane until the vehicle catches up with the overtaking target vehicle so as to travel substantially parallel thereto. A travel distance L2 in the overtaking acceleration first half phase P2 can be calculated using Equation (15), illustrated below, for example.

$$L2=(1/(2\times(d^2X/dt^2)t))\times(V2^2-V1^2) \quad (15)$$

Here, V2 is a target vehicle speed following overtaking acceleration, and takes the smaller value of a value (Vf+ΔV) obtained by adding a preset predetermined speed (in other words, a (target) relative speed during overtaking) ΔV to a vehicle speed Vf of the overtaking target vehicle, and a speed limit Vlim (a preset speed limit or the speed limit of the road, which is recognized from the respective input signals described above), for example.

Further, $(d^2X/dt^2)$ t is a target overtaking acceleration, which is set using Equation (16), illustrated below, for example.

$$(d^2X/dt^2)t=\min((d^2X/dt^2)0-Kg\times Ug, \mu e\times g) \quad (16)$$

Here, min denotes a minimum function for selecting the smaller of $((d^2X/dt^2)$ 0−Kg×Ug) and (μe×g), $(d^2X/dt^2)$ 0 denotes a preset reference value of the overtaking acceleration, Kg denotes the road surface gradient coefficient, and g denotes the gravitational acceleration.

When the overtaking acceleration first half phase P2 is completed in S102, the routine advances to S103, where the overtaking acceleration second half phase P3 of FIG. 9 is executed. Note that while the travel controller 10 executes the overtaking acceleration second half phase P3, an overtaking acceleration second half phase execution flag Fp3 is set (Fp3=1).

In the overtaking acceleration second half phase P3, travel control is executed to accelerate the vehicle travelling substantially parallel to the overtaking target vehicle in the overtaking lane in order to change lanes back to the original lane. A travel distance L3 in the overtaking acceleration second half phase P3 can be calculated using Equation (17), illustrated below, for example.

$$L3=(Lp-(1/(2\times(d^2X/dt^2)t))\times(V2-V1)^2)\times V2/(V2-V1) \quad (17)$$

Here, Lp is a value obtained by adding a target inter-vehicle distance following overtaking to the inter-vehicle distance relative to the overtaking target vehicle.

When the overtaking acceleration second half phase P3 is completed in S103, the routine advances to S104, where the original lane returning lane change phase P4 of FIG. 9 is executed. Note that while the travel controller 10 executes the original lane returning lane change phase P4, an original lane returning lane change phase execution flag Fp4 is set (Fp4=1).

In the original lane returning lane change phase P4, control is executed until the vehicle changes lanes back to the original lane after overtaking the overtaking target vehicle in the overtaking lane. When a travel distance L4 in the original lane returning lane change phase P4 is determined using a normalization polynomial of the minimum jerk trajectory, for example, the travel distance L4 is calculated from Equation (8) using Equation (18), illustrated below.

$$L4=(5.77\times W\times V2^2/(d^2y/dt^2)\max\_c)^{1/2} \quad (18)$$

Further, the target steering angle θHt required for the control (i.e. to be output to the steering control device 23) is calculated on the basis of Equation (13) with the vehicle speed V and the distance L set respectively at V4 and L4. Hence, a travel distance Lr covered during the overtaking control executed by the travel controller 10 according to this implementation is L1+L2+L3+L4.

Next, failsafe control performed during the overtaking control executed as described above when an acquisition failure of the travel environment information is detected and a failure is detected in the steering system of the vehicle will be described using flowcharts illustrated in FIGS. 3 to 6.

First, in S201, a determination is made as to whether or not an automatic driving condition is established. When the automatic driving condition is established, the routine advances to S202, and when the automatic driving condition is not established, the program is terminated.

In S202, a determination is made as to whether or not an overtaking travel control condition is established. When it is determined that the overtaking travel control condition is established, the routine advances to S203, and when it is determined that the overtaking travel control condition is not established, the program is terminated.

In S203, a determination is made as to whether or not an acquisition failure of the travel environment information has been detected and a failure has been detected in the steering system of the vehicle. When an acquisition failure of the travel environment information has been detected and a failure has been detected in the steering system of the vehicle, the routine advances to S204, and when either acquisition of the travel environment information or the steering system of the vehicle is normal, the program is terminated.

When the routine advances to S204, a warning indicating the failure relating to acquisition of the travel environment information and the failure in the steering system of the vehicle is issued through one of the display device 24 and the speaker/buzzer 25.

Next, the routine advances to S205, where a determination is made as to whether or not the overtaking start lane change phase P1 is underway (whether or not Fp1=1). When the overtaking start lane change phase P1 is determined to be underway (when Fp1=1), the routine jumps to S301 in FIG. 4, and when the overtaking start lane change phase P1 is determined not to be underway (when Fp1=0), the routine advances to S206.

In S206, a determination is made as to whether or not one of the overtaking acceleration first half phase P2 (Fp2=1) and the overtaking acceleration second half phase P3 (Fp3=1) is underway. When it is determined that either Fp2=1 or Fp3=1, the routine jumps to S401 in FIG. 5, and when neither Fp2=1 nor Fp3=1, the routine advances to S207.

In S207, a determination is made as to whether or not the original lane returning lane change phase P4 is underway (whether or not Fp4=1). When the original lane returning lane change phase P4 is determined to be underway (when Fp4=1), the routine jumps to S501 in FIG. 6, and when the original lane returning lane change phase P4 is determined not to be underway (when Fp4=0), the program is terminated.

Figure 4:
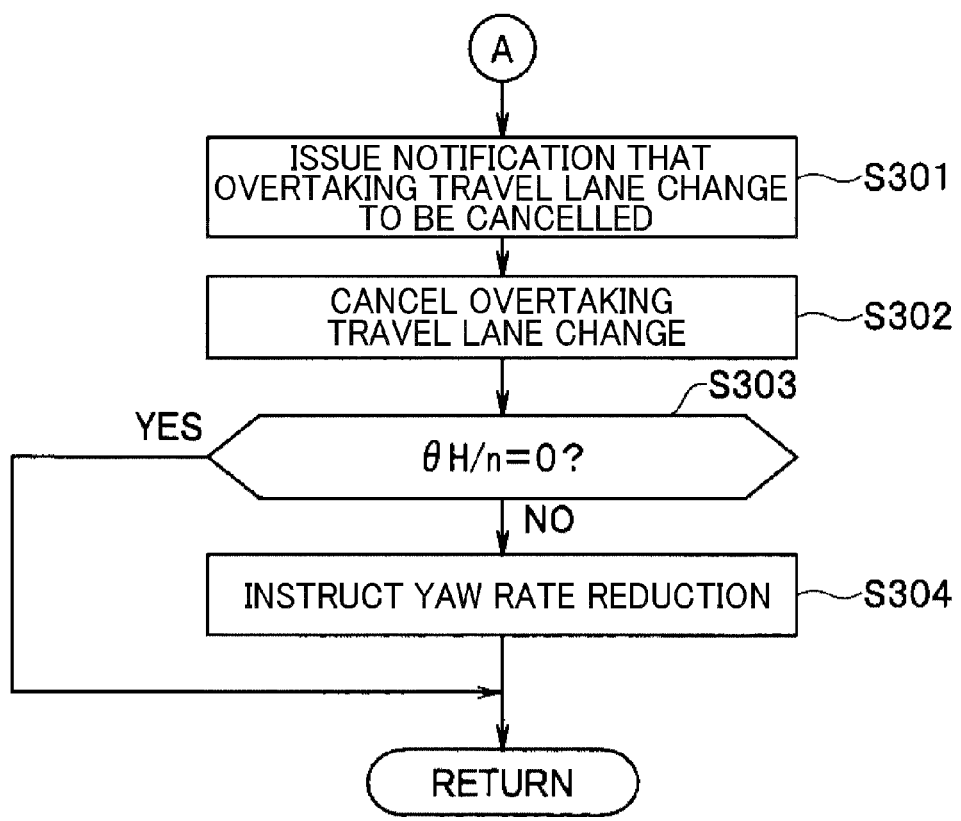
FIG. 4 is a flowchart following on from the flowchart of FIG. 3 and illustrating a failsafe program executed during an overtaking lane change.

A case in which the overtaking start lane change phase P1 is determined to be underway (Fp1=1) in S205 such that the routine advances to the flowchart of FIG. 4 will now be described.

First, in S301, a notification indicating that the lane change for overtaking the overtaking target vehicle by automatic driving is to be cancelled is issued through one of the display device 24 and the speaker/buzzer 25. The routine then advances to S302, where the lane change for overtaking the overtaking target vehicle by automatic driving is cancelled.

Next, the routine advances to S303, where a determination is made as to whether or not the front wheel steering angle δf (=θH/n) is substantially zero.

When it is determined in S303 that the front wheel steering angle δf is substantially zero, the routine is terminated as is. When it is determined that the front wheel steering angle δf is not substantially zero, the routine advances to S304, where a signal is output to the brake control device 22 to instruct the brake control device 22 to execute the yaw brake control in order to reduce the yaw rate γ by modifying the unique stability factor A of the vehicle (to the value Af that is larger than normal (in an under steering direction)). Accordingly, the brake control device 22 executes the yaw brake control to reduce the yaw rate γ, whereby the vehicle behavior is stabilized.

More specifically, the brake control device 22 calculates the target yaw rate γt using Equation (19), illustrated below, for example, and then performs the yaw brake control to align the yaw rate γ of the vehicle body with the target yaw rate γt.

$$\gamma t = (1/(1+Af \times V^2)) \times (V/1) \times (\theta H/n) \quad (19)$$

Figure 5:
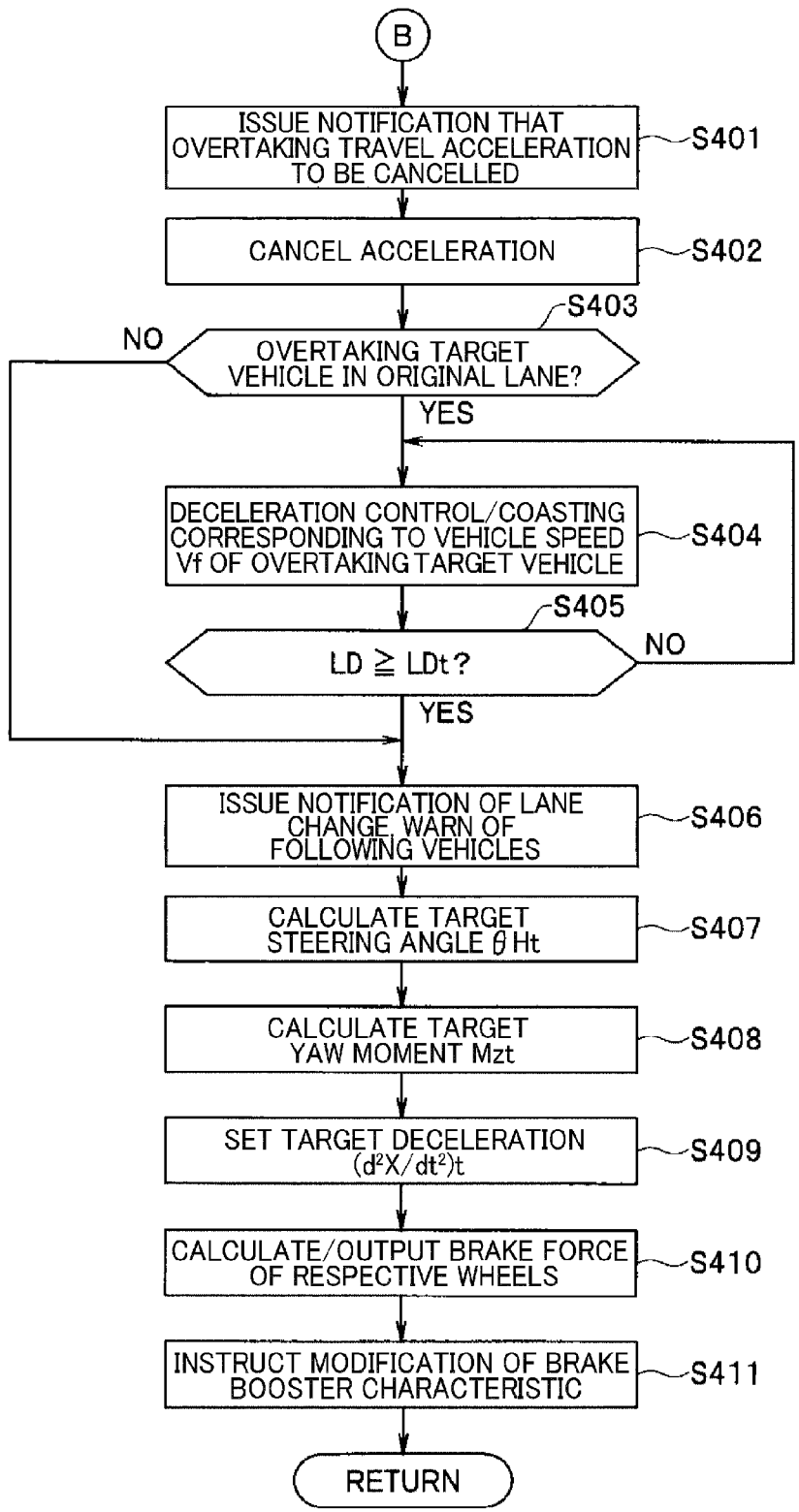
FIG. 5 is a flowchart following on from the flowchart of FIG. 3 and illustrating a failsafe program executed during acceleration following the lane change.

Next, a case in which one of the overtaking acceleration first half phase P2 (Fp2=1) and the overtaking acceleration second half phase P3 (Fp3=1) is determined to be underway in S206 such that the routine advances to the flowchart of FIG. 5 will be described.

First, in S401, a notification indicating that acceleration for overtaking the overtaking target vehicle by automatic driving is to be cancelled is issued through one of the display device 24 and the speaker/buzzer 25. The routine then advances to S402, where acceleration for overtaking the overtaking target vehicle by automatic driving is cancelled.

Next, the routine advances to S403, where a determination is made as to whether or not the overtaking target vehicle exists in the original lane on the basis of the travel environment information detected most recently before the failure relating to acquisition of the travel environment information. When the overtaking target vehicle is determined not to exist in the original lane so that a lane change can be performed safely back to the travel lane prior to the lane change, the routine jumps to S406.

When the overtaking target vehicle is determined to exist in the original lane in S403, on the other hand, the routine advances to S404.

In S404, the vehicle speed V of the vehicle is reduced by a predetermined (preset) deceleration until the vehicle speed V falls below the vehicle speed Vf of the overtaking target vehicle. When the vehicle speed V of the vehicle is lower than the vehicle speed Vf of the overtaking target vehicle, the routine advances to S405. Note that a value detected most recently is used as the vehicle speed Vf of the overtaking target vehicle, while a value detected at regular intervals is used as the vehicle speed V of the vehicle.

Figure 10:
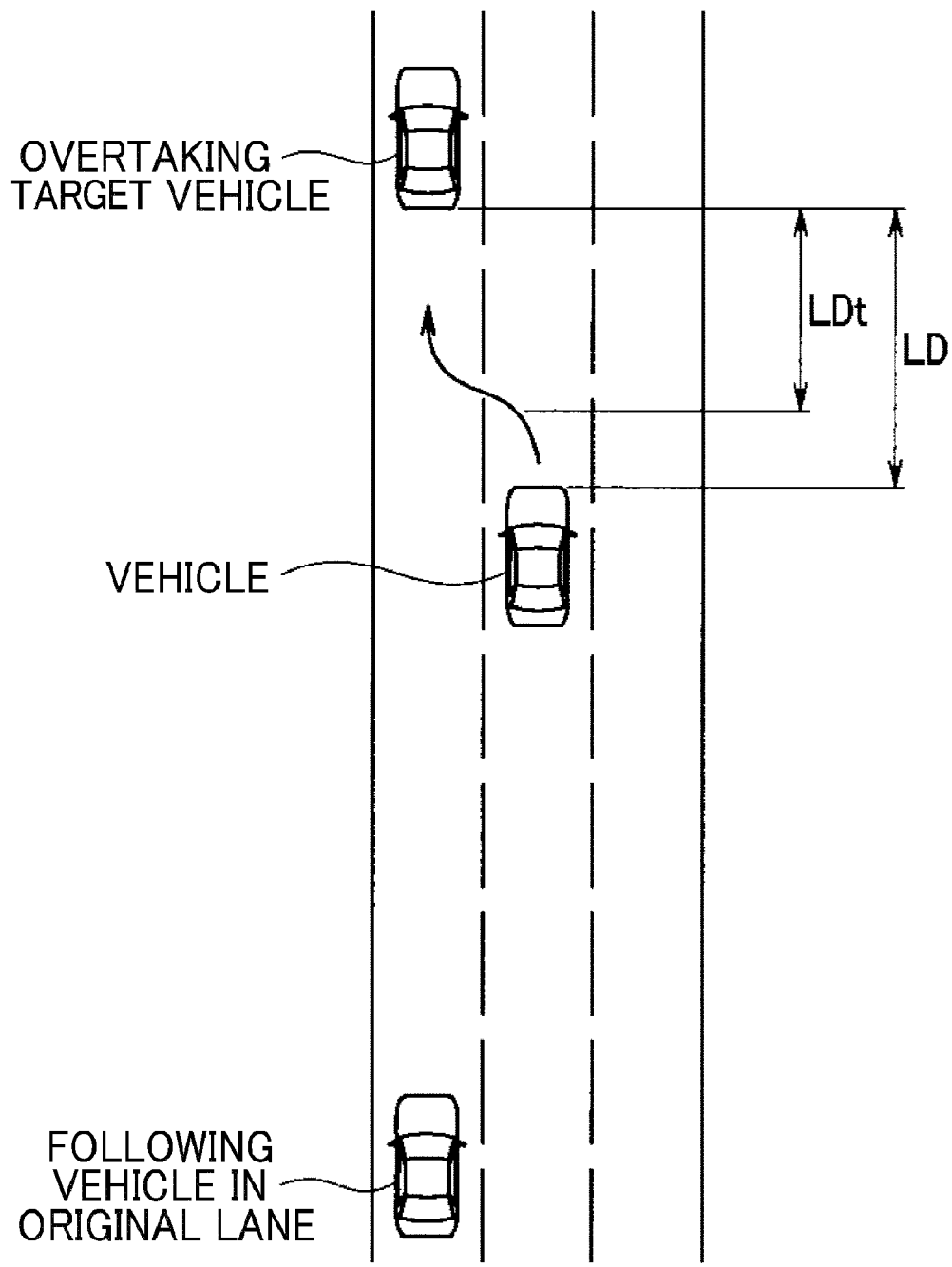
FIG. 10 is an illustrative view illustrating a vehicle that returns to the original travel lane in response to failsafe control executed as the vehicle accelerates following a lane change, according to this implementation of the present invention.

In S405, an inter-vehicle distance LD (=∫(Vf−V)×dt) between the overtaking target vehicle and the vehicle is compared with a threshold LDt set in advance by experiment, calculation, and so on. When the inter-vehicle distance LD between the overtaking target vehicle and the vehicle is shorter than the threshold LDt (LD<LDt), the routine returns to S404, and when the inter-vehicle distance LD between the overtaking target vehicle and the vehicle equals or exceeds the threshold LDt (LD≥LDt), the routine advances to S406. Note that a relationship between the inter-vehicle distance LD between the overtaking target vehicle and the vehicle and the threshold LDt is illustrated in FIG. 10.

When the routine advances to S406 from S403 or S405, notifications are issued to inform the driver that a lane change is to be performed back to the original travel lane due to a failure relating to acquisition of the travel environment information and a failure in the steering system, and to prompt the driver to beware of following vehicles.

Next, the routine advances to S407, where the target steering angle θHt is calculated on the basis of Equation (13) and so on, for example.

Next, the routine advances to S408, where a target yaw moment Mzt of the yaw brake control is calculated on the basis of Equation (20), illustrated below, for example.

$$Mzt = (2 \times 1 \times Kf \times Kr)/(Kf+Kr) \times (\theta Ht/n) \quad (20)$$

Here, Kf denotes an equivalent cornering power of the front wheels, and Kr denotes an equivalent cornering power of the rear wheels.

Figure 7:
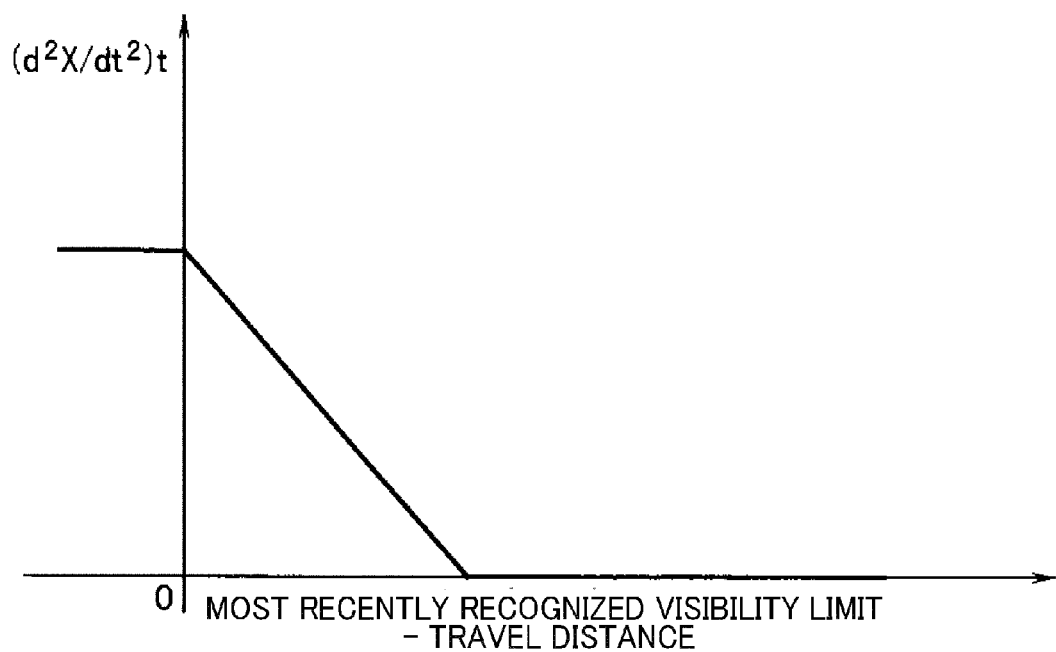
FIG. 7 is an illustrative characteristic diagram illustrating a set target deceleration according to this implementation of the present invention.

Next, the routine advances to S409, where the target deceleration $(d^2X/dt^2)$ t is set on the basis of the visibility limit of the travel environment information detected most recently prior to the failure relating to acquisition of the travel environment information by referring to a map of the target deceleration $(d^2X/dt^2)$ t such as that illustrated in FIG. 7, for example. On the map of the target deceleration $(d^2X/dt^2)$ t, illustrated in FIG. 7, the target deceleration $(d^2X/dt^2)$ t is set on the basis of the information indicating the most recently obtained visibility limit so as to increase steadily as the vehicle continues to travel. In other words, when failures occur in the steering system and in relation to the travel environment information acquisition, the vehicle is decelerated at a steadily higher deceleration in accordance with the continuous travel distance, thereby ensuring that the vehicle can be stopped and safety can be secured reliably in the vehicle. Note that when the distance from the visibility limit is long, the target deceleration $(d^2X/dt^2)$ t is set at zero, thereby avoiding a situation in which the lane change realized by performing the yaw brake control on the vehicle is impaired due to deceleration.

Next, the routine advances to S410, where a brake force of the respective wheels (a brake force Ffi of a turn inner side front wheel, a brake force Ffo of a turn outer side front wheel, a brake force Fri of a turn inner side rear wheel, and a brake force Fro of a turn outer side rear wheel) is calculated using Equations (21) to (24), illustrated below, and output to the brake control device 22.

$$Ffi = (drx/2) \times Fx + dry \times Fy \quad (21)$$

$$Ffo = (drx/2) \times Fx - dry \times Fy \quad (22)$$

$$Fri = ((1-drx)/2) \times Fx + (1-dry) \times Fy \quad (23)$$

$$Fro = ((1-drx)/2) \times Fx - (1-dry) \times Fy \quad (24)$$

Here, Fx is a sum of brake forces corresponding to the target deceleration $(d^2X/dt^2)$ t, and is calculated using Equation (25) illustrated below, in which m denotes the vehicle mass.

$$Fx = -m \times (d^2X/dt^2)t \quad (25)$$

Further, Fy is a sum of left-right wheel brake force differences corresponding to the target yaw moment Mzt, and is calculated using Equation (26) illustrated below, in which d denotes the tread.

$$Fy = Mzt/d \quad (26)$$

Furthermore, drx is a front-rear braking force distribution ratio (front wheel side braking force/total braking force) of the deceleration control, and dry is a front-rear axle distribution (yaw moment of front axle/total yaw moment) of the yaw moment control.

Figure 8:
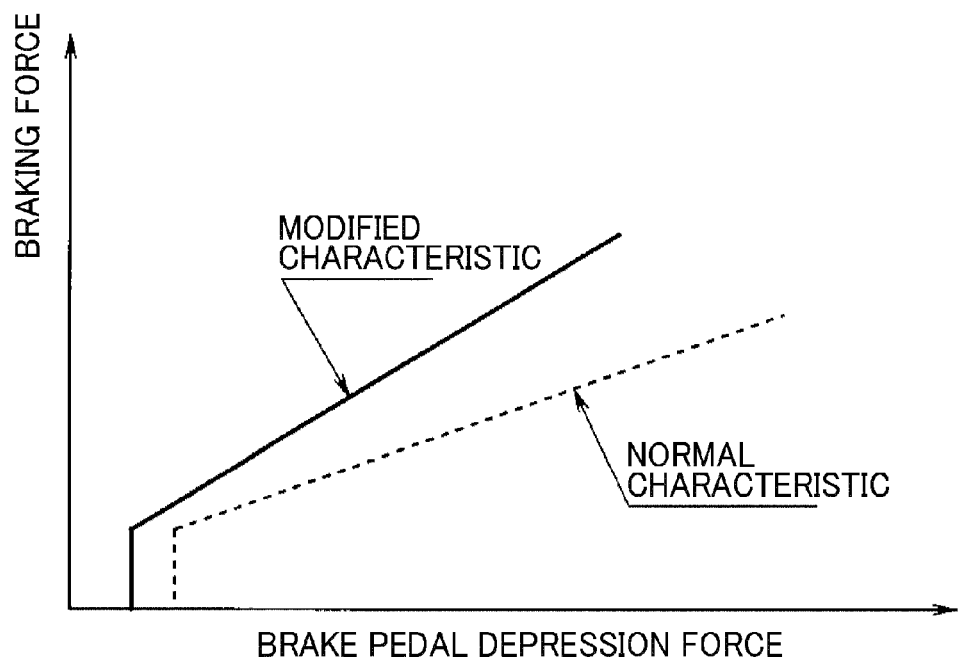
FIG. 8 is an illustrative view illustrating modification of a brake booster characteristic according to this implementation of the present invention.

The routine then advances to S411, where the brake control device 22 is instructed to modify the characteristic of the braking force generated in accordance with the brake pedal depression force obtained by the driver during a brake operation from the normal characteristic in the direction (see FIG. 8) for increasing the braking force value and the braking force generation response corresponding to the brake pedal depression force. This processing is performed to ensure that a collision is reliably avoided in a region where no travel environment information has been obtained. Note that at the moment when the system failure occurs and the notification/warning is issued, the driver may panic and perform an emergency braking operation. Therefore, the braking force characteristic may be set at a normal characteristic of the electric booster within the most recently detected visibility range.

Figure 6:
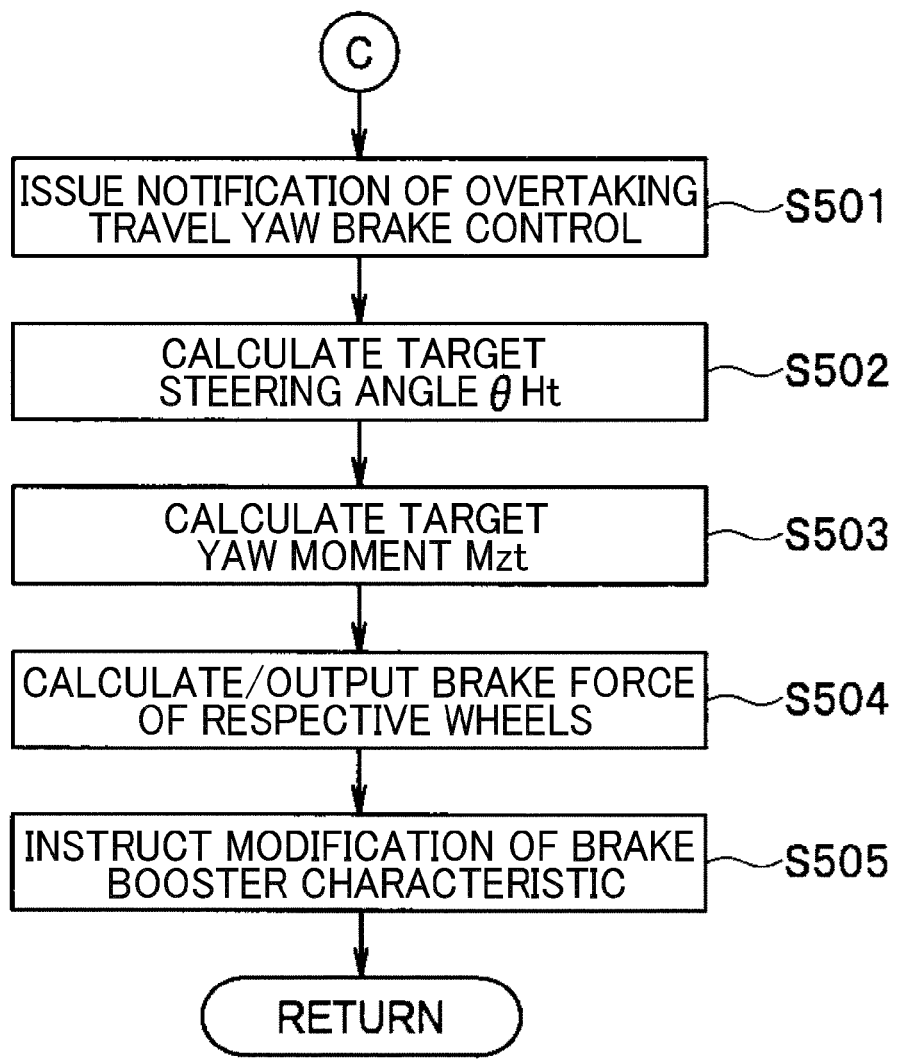
FIG. 6 is a flowchart following on from the flowchart of FIG. 3 and illustrating a failsafe program executed during a lane change back to an original lane following overtaking acceleration.

A case in which the original lane returning lane change phase P4 is determined to be underway (Fp4=1) in S207 such that the routine advances to the flowchart of FIG. 6 will now be described.

First, in S501, a notification indicating that a lane change is to be performed back to the original lane of the overtaking operation by yaw brake control is issued through one of the display device 24 and the speaker/buzzer 25.

Next, the routine advances to S502, where the target steering angle θHt is calculated on the basis of Equation (13) and so on, for example.

Next, the routine advances to S503, where the target yaw moment Mzt of the yaw brake control is calculated on the basis of Equation (20), for example.

Next, the routine advances to S504, where the brake force of the respective wheels (the brake force Ffi of the turn inner side front wheel, the brake force Ffo of the turn outer side front wheel, the brake force Fri of the turn inner side rear wheel, and the brake force Fro of the turn outer side rear wheel) is calculated using Equations (21) to (24), for example, and output to the brake control device 22. Here, the brake force of the respective wheels, calculated in S504, is Fx=0.

Next, the routine advances to S505, where the brake control device 22 is instructed to modify the characteristic of the braking force generated in accordance with the brake pedal depression force obtained by the driver during a brake operation from the normal characteristic in the direction (see FIG. 8) for increasing the braking force value and the braking force generation response corresponding to the brake pedal depression force. Note that at the moment when the system failure occurs and the notification/warning is issued, the driver may panic and perform an emergency braking operation. Therefore, the braking force characteristic may be set at the normal characteristic of the electric booster within the most recently detected visibility range.

Hence, according to this implementation, the travel controller 10 detects the overtaking target vehicle ahead of the vehicle in the same travel lane, and executes overtaking control to overtake the overtaking target vehicle using automatic driving control. When an acquisition failure of the travel environment information is detected and a failure is detected in the steering system of the vehicle during the overtaking control, the travel controller 10 modifies the overtaking control by activating required substitute control in accordance with the travel environment information obtained most recently before detecting the acquisition failure in the travel environment information acquisition unit, the information relating to the overtaking target vehicle, the travel information, and conditions during the overtaking control (more specifically, conditions while changing lanes in order to overtake the overtaking target vehicle, conditions while accelerating following the lane change, and conditions while changing lanes back to the original lane following the overtaking acceleration). Hence, even when an acquisition failure of the travel environment information occurs and a failure occurs in the steering system used to execute a lane change during overtaking control executed using an automatic driving technique, failsafe control can be performed appropriately, and as a result, sufficient safety can be secured.

The invention claimed is:

1. A travel control apparatus for a vehicle, the apparatus comprising:
a travel controller configured to:
acquire travel environment information relating to a travel environment in which the vehicle travels, wherein the vehicle is in an automatic driving mode;
acquire travel information relating to the vehicle; and
perform an overtaking control when an overtaking target vehicle is detected in front of the vehicle in a travel lane on the basis of the travel environment information and the travel information, the overtaking control allows the vehicle traveling to overtake the overtaking target vehicle, the overtaking control includes a first phase in which the vehicle performs a first lane change from the travel lane to an overtaking lane, a second phase in which the vehicle passes the overtaking target vehicle via the overtaking lane, and a third phase in which the vehicle performs a second lane change from the overtaking lane back to the travel lane,
wherein, when a first failure is detected in acquiring the travel environment information and a second failure is detected in a steering system of the vehicle during the overtaking control, the travel controller:
determines a phase of the overtaking control at a time of detecting the first failure and the second failure, and
activates a substitute control corresponding to the determined phase of the overtaking control, the substitute control being performed in accordance with the travel environment information obtained most recently before detecting the first failure of the travel environment information, information relating to the overtaking target vehicle, and the travel information.

2. The travel control apparatus for a vehicle according to claim 1, wherein, when the first failure and the second failure are detected during the second phase of the overtaking control, the travel controller determines, on the basis of the travel environment information acquired most recently before the first failure, that the second lane change from the overtaking lane back to the travel lane is safe to perform, and
in response to the determination, the travel controller activates yaw brake control to apply a yaw moment to the vehicle using a brake force, executes deceleration control in accordance with a visibility limit of the most recently acquired travel environment information, and allows the vehicle to perform the second lane change from the overtaking lane back to the travel lane.

3. The travel control apparatus for a vehicle according to claim 1, wherein, when the first failure and the second failure are detected during the second phase of the overtaking control, travel controller determines that the overtaking target vehicle exists in the original travel lane according to the travel environment information acquired most recently before the first failure, in response to the determination, the travel controller executes deceleration control in accordance with a vehicle speed of the overtaking target vehicle so that the vehicle retreats to a predetermined relative position behind the overtaking target vehicle, activates yaw brake control to apply a yaw moment to the vehicle using a brake force, executes the deceleration control in accordance with a visibility limit of the most recently acquired travel environment information, and allows the vehicle to perform the second lane change from the overtaking lane back to the travel lane.

4. The travel control apparatus for a vehicle according to claim 2, wherein, when the first failure and the second failure are detected during the second phase of the overtaking control, travel controller determines that the overtaking target vehicle exists in the travel lane according to the travel environment information acquired most recently before the first failure, in response to the determination, the travel controller executes deceleration control in accordance with a vehicle speed of the overtaking target vehicle so that the vehicle retreats to a predetermined relative position behind the overtaking target vehicle, activates yaw brake control to apply a yaw moment to the vehicle using a brake force, executes the deceleration control in accordance with a visibility limit of the most recently acquired travel environment information, and allows the vehicle to perform the second lane change from the overtaking lane back to the travel lane.

5. The travel control apparatus for a vehicle according to claim 1, wherein, when the first failure and the second failure are detected during the third phase of the overtaking control, the travel controller activates yaw brake control to apply a yaw moment to the vehicle using a brake force and allows the vehicle to perform the second lane change from the overtaking lane back to the travel lane.

6. The travel control apparatus for a vehicle according to claim 2, wherein, when the first failure and the second failure are detected during the third phase of the overtaking control, the travel controller activates yaw brake control to apply a yaw moment to the vehicle using a brake force and allows the vehicle to perform the second lane change from the overtaking lane back to the travel lane.

7. The travel control apparatus for a vehicle according to claim 1, wherein, when the first failure and the second failure are detected during the overtaking control, the travel controller modifies a characteristic of a braking force generated by a driver during a brake operation.

8. The travel control apparatus for a vehicle according to claim 2, wherein, when the first failure and the second failure are detected during the overtaking control, the travel controller modifies a characteristic of a braking force generated by a driver during a brake operation.

9. The travel control apparatus for a vehicle according to claim 1, wherein, when the first failure and the second failure are detected during the first phase of the overtaking control, the travel controller cancels the first lane change from the travel lane to the overtaking lane, and, when a steering angle is not substantially zero, executes yaw brake control to reduce a yaw rate of the vehicle using a brake force.

10. The travel control apparatus for a vehicle according to claim 9, wherein, when the first failure and the second failure are detected during the second phase of the overtaking control, the travel controller determines, on the basis of the travel environment information detected most recently before the first failure, that the second lane change from the overtaking lane back to the travel lane is safe to perform, and in response to the determination, the travel controller activates yaw brake control to apply a yaw moment to the vehicle using a brake force, executes deceleration control in accordance with a visibility limit of the most recently detected travel environment information, and allows the vehicle to perform the second lane change from the overtaking lane back to the travel lane.

11. The travel control apparatus for a vehicle according to claim 9, wherein, when the first failure and the second failure are detected the second phase of the overtaking control, travel controller determines that the overtaking target vehicle exists in the travel lane according to the travel environment information detected most recently before the first failure, in response to the determination, the overtaking controller executes deceleration control in accordance with a vehicle speed of the travel target vehicle so that the vehicle retreats to a predetermined relative position behind the overtaking target vehicle, activates yaw brake control to apply a yaw moment to the vehicle using a brake force, executes the deceleration control in accordance with a visibility limit of the most recently acquired travel environment information, and allows the vehicle to perform the second lane change from the overtaking lane back to the travel lane.

12. The travel control apparatus for a vehicle according to claim 9, wherein, when the first failure and the second failure are detected the third phase of the overtaking control, the travel controller activates yaw brake control to apply a yaw moment to the vehicle using a brake force and allows the vehicle to perform the second lane change from the overtaking lane back to the travel lane.

13. A travel control apparatus for a vehicle, the apparatus comprising:

a travel controller configured to:
acquire travel environment information relating to a travel environment in which the vehicle travels, wherein the vehicle is in an automatic driving mode;
acquire travel information relating to the vehicle; and
perform an overtaking control when an overtaking target vehicle is detected in front of the vehicle in a travel lane on the basis of the travel environment information and the travel information, the overtaking control allows the vehicle traveling to overtake the overtaking target vehicle, wherein, when a first failure is detected in acquiring the travel environment information and a second failure is detected in a steering system of the vehicle during a first lane change from the travel lane to an overtaking lane after detecting the overtaking target vehicle, the travel controller cancels the first lane change from the travel lane to the overtaking lane, and, when a steering angle is not substantially zero, executes yaw brake control to reduce a yaw rate of the vehicle using a brake force.

14. The travel control apparatus for a vehicle according to claim 13, wherein, when the first failure and the second failure are detected during an overtaking motion performed after detecting the overtaking target vehicle and changing lanes from the travel lane to the overtaking lane, the travel controller determines, on the basis of the travel environment information acquired most recently before the first failure, that a second lane change from the overtaking lane back to the travel lane is safe to perform, and in response to the determination, the travel controller activates yaw brake control to apply a yaw moment to the vehicle using a brake force, executes deceleration control in accordance with a visibility limit of the most recently acquired travel environment information, and allows the vehicle to perform the second lane change from the overtaking lane back to the travel lane.

15. The travel control apparatus for a vehicle according to claim 13, wherein, when the first failure and a second failure are detected during an overtaking motion performed after detecting the overtaking target vehicle and changing lanes from the travel lane to the overtaking lane, the travel controller determines that the overtaking target vehicle exists in the travel lane according to the travel environment information acquired most recently before the first failure, in response to the determination, the travel controller executes deceleration control in accordance with a vehicle speed of the overtaking target vehicle so that the vehicle retreats to a predetermined relative position behind the overtaking target vehicle, activates yaw brake control to apply a yaw moment to the vehicle using a brake force, executes the deceleration control in accordance with a visibility limit of the most recently acquired travel environment information, and allows the vehicle to perform the second lane change from the overtaking lane back to the travel lane.

16. The travel control apparatus for a vehicle according to claim 14, wherein, when the first failure and the second failure are detected in the steering system of the vehicle during the overtaking motion performed after detecting the overtaking target vehicle and changing lanes from the travel lane to the overtaking lane, the travel controller determines that the overtaking target vehicle exists in the travel lane according to the travel environment information acquired most recently before the first failure, in response to the determination, the travel controller executes deceleration control in accordance with a vehicle speed of the overtaking target vehicle so that the vehicle retreats to a predetermined relative position behind the overtaking target vehicle, activates yaw brake control to apply a yaw moment to the vehicle using a brake force, executes the deceleration control in accordance with a visibility limit of the most recently acquired travel environment information, and allows the vehicle to perform the second lane change from the overtaking lane back to the travel lane.

17. The travel control apparatus for a vehicle according to claim 13, wherein, when the first failure and the second failure are detected during a lane change back to the original travel lane after detecting the overtaking target vehicle, changing lanes from the travel lane to the overtaking lane, and completing the overtaking motion, the travel controller activates yaw brake control to apply a yaw moment to the vehicle using a brake force and allows the vehicle to perform a second lane change from the overtaking lane back to the travel lane.

18. The travel control apparatus for a vehicle according to claim 14, wherein, when the first failure and the second failure are detected in the steering system of the vehicle during a lane change back to the original travel lane after detecting the overtaking target vehicle, changing lanes from the travel lane to the overtaking lane, and completing the overtaking motion, the travel controller activates yaw brake control to apply a yaw moment to the vehicle using a brake force and allows the vehicle to perform the second lane change from the overtaking lane back to the travel lane.

19. The travel control apparatus for a vehicle according to claim 13, wherein, when the first failure and the second failure are detected during the overtaking control, the travel controller modifies a characteristic of a braking force generated by a driver during a brake operation.

20. The travel control apparatus for a vehicle according to claim 14, wherein, when the first failure and the second failure are detected during the overtaking control, the travel controller modifies a characteristic of a braking force generated by a driver during a brake operation.

* * * * *